(12) United States Patent
Kryzak

(10) Patent No.: US 6,685,363 B2
(45) Date of Patent: Feb. 3, 2004

(54) PASSIVE SELF-ALIGNMENT TECHNIQUE FOR ARRAY LASER TRANSMITTERS AND RECEIVERS FOR FIBER OPTIC APPLICATIONS

(75) Inventor: Charles J. Kryzak, Mendota Heights, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/246,578

(22) Filed: Sep. 18, 2002

(65) Prior Publication Data

US 2003/0007750 A1 Jan. 9, 2003

Related U.S. Application Data

(62) Division of application No. 09/536,808, filed on Mar. 28, 2000, now Pat. No. 6,491,446.

(51) Int. Cl.[7] .................................................. G02B 6/36
(52) U.S. Cl. .............................. 385/89; 385/88; 385/53
(58) Field of Search ............................. 385/89, 88, 53, 385/92

(56) References Cited

U.S. PATENT DOCUMENTS

| 5,151,964 A | 9/1992 | Carpenter et al. |
| 5,359,686 A | 10/1994 | Galloway et al. |
| 5,367,593 A | 11/1994 | Lebby et al. |
| 5,381,498 A | 1/1995 | Bylander |
| 6,034,808 A | 3/2000 | Isaksson |
| 6,056,448 A | 5/2000 | Sauter et al. |
| 6,130,979 A | 10/2000 | Isaksson et al. |
| 6,227,720 B1 | 5/2001 | Isaksson |
| 6,318,909 B1 | 11/2001 | Giboney et al. |

*Primary Examiner*—Rodney Bovernick
*Assistant Examiner*—Sung Pak
(74) *Attorney, Agent, or Firm*—Kevin W. Cyr; Patrick M. Hogan

(57) ABSTRACT

An active optical device having a plurality of optical receiving or transmitting elements is secured to a carrier having two holes adapted to receive respective alignment pins of the connector. The optical device is secured to the carrier by a first solder ball contract array pattern on a surface of the optical device substrate and a second matching solder ball contact array pattern on a surface of the carrier. Solder balls disposed between the first solder ball contact array pattern of the optical device substrate and the second solder ball contact array pattern are melted so that solder reflow self-aligns the patterns, and further positions the optical device array in a predetermined orientation with respect to the alignment holes in the carrier. A flexible electrical interconnect member having a plurality of electrical traces is coupled to the active optical device at one of its ends and the other end is available for coupling to another device.

4 Claims, 6 Drawing Sheets

PASSIVE SELF-ALIGNMENT TECHNIQUE FOR ARRAY LASER TRANSMITTERS AND RECEIVERS FOR FIBER OPTIC APPLICATIONS

This application is a divisional application of application Ser. No. 09/536,808 filed Mar. 28, 2000 now U.S. Pat. No. 6,491,446, in the name of Charles J. Kryzak and entitled "Passive self-alignment technique for array laser transmitters and receivers for fiber optic applications".

BACKGROUND OF THE INVENTION

1. Field of the Invention

The present invention generally relates to the interconnection of optical devices and optical media, and more particularly to a method of passive self-alignment of an array of active optical devices (e.g., laser drivers and photodetectors) to a corresponding array of optical fibers. The method also allows for the integration of other electronic components, such as amplifier drivers, in the interconnection.

2. Description of Related Art

Optical fibers have replaced copper wire in recent years as the preferred medium for carrying telecommunications and data signals, due to the high efficiency of optical data transmission. As with copper wire, it is necessary to provide for the interconnection of optical fibers, during installation, repair or replacement of the fibers, and to terminate the fibers onto active optical devices.

Optical devices include, for example, optical sensors (photoelectric diodes or photodetectors) and light sources (typically solid-state devices, such as light-emitting diodes (LEDs) or laser diodes). The termination of an optical fiber may be indirect, i.e., the fiber may be connected to some other (passive) optical device such as a beam splitter or polarizer, before the light beam is directed to the active optical device.

There are generally two kinds of optical interconnection devices, splices and connectors. The term "splice" usually refers to a device which provides a permanent connection between a pair of optical fibers (i.e., a connection that is not intended to be removable). Many fiber optic splices employ plate elements having fiber-receiving V-shaped grooves, with means provided for clamping the terminal ends of a pair of fibers in a common groove. Some of these devices are designed to interconnect a plurality of pairs of fibers; see, e.g., U.S. Pat. No. 5,151,964.

The term "connector," in contrast, usually refers to a device which may be engaged and disengaged repeatedly, often between different plugs and receptacles. Connectors also can be used to removably interconnect a plurality of pairs of fibers; see, e.g., U.S. Pat. No. 5,381,498. The present invention is generally related to such devices, although the term "connector" should not be construed in a limiting sense, since the present invention may inherently provide a permanent, as well as temporary connection/termination.

There are two primary types of commercially available fiber optic connectors, namely, ferrule connectors and bionic connectors. Ferrule connectors use a ferrule plug, typically ceramic, having a central bore which receives a single optical fiber. Bionic connectors use a plug in the shape of a truncated cone. Both connectors usually combine a pair of plugs fitting into a common socket or receptacle to provide a completed connection. The prior art includes hybrid ferrule connector/splices, such as those shown in U.S. Pat. Nos. 4,986,626 and 5,159,655.

One area which has not been adequately addressed by the prior art, however, is the interconnection, or termination, of an array of optical fibers to a corresponding array of active optical devices. Since the plugs of ferrule and bionic connectors receive only a single fiber, a relatively large bank of such connectors must be provided to terminate several fibers. One drawback with multifiber connectors is the poor interconnection densities that are achieved. While some ferrule designs have densities around 2 connections per square centimeter, this may be compared to densities of 4 connections or more per square centimeter in some copper wire connectors, such as an RJ45 connector. Some non-ferrule designs provide slightly improved densities, such as that described in U.S. Pat. No. 4,045,121, but that connector has far too many parts and is not easily installed. A simpler multifiber connector is depicted in European Patent Application No. 514,722 (commonly referred to as an "MT" connector).

Fiber alignment is also a problem when terminating an array of fibers at respective optical devices. Each fiber must not only be properly aligned transversely, i.e., with the fiber tip precisely located at the emitter or receiver of the active device, but must further be positioned in the proper angular orientation to ensure that the light beam exits/enters the fiber in an optimum direction with respect to the device. Any air gap between the endface of an optical fiber and the optical surface of a respective active device should also be minimized in order to reduce transmission losses across the interface. Accurate alignment of fibers with active devices is thus a tedious and time-consuming process.

In order to discover the best position/orientation, active alignment techniques detect actual transmission of optical signals across the device-fiber interface. For optical sensors, active alignment is accomplished by transmitting a signal through the fiber to the sensor, and then monitoring the sensor output while moving the terminal end of the fiber, or other alignment element. The signal can be fed into the other (distal) end of the fiber, or injected at an intermediate point using a "clip-on" instrument that creates a microbend in the fiber at the injection point.

For light sources, active alignment is accomplished by powering up the device, and then monitoring the signal that flows though the fiber while moving the terminal end of the fiber or other alignment element. The signal can be monitored by sensing the output at the distal end of the fiber, or by picking the signal off at an intermediate point using a clip-on instrument. For either type of optical device (transmitter or receiver), active alignment thus requires extensive instrumentation.

Another problem in terminating optical fibers relates to the wide dissimilarities in the myriad connector styles. Because of the different sizes and geometries of connector bodies, ferrules, and other components, any technique adapted for use with one particular connector is generally incompatible with other connector designs. Special adapters kits or jumper cables may be necessary to achieve compatibility.

In light of the foregoing, it would be desirable to devise an improved method of terminating an array of optical fibers to an array of optical devices, which allows for the passive self-alignment of the device array to the optical fiber array. It would be further advantageous if the method accommodated higher interconnection densities, and were generally usable with any commercially available fiber optic connector.

SUMMARY OF THE INVENTION

It is therefore one object of the present invention to provide an improved method of interconnecting or terminating a plurality of optical fibers with a plurality of respective active optical devices.

It is another object of the present invention to provide such a method that allows for the passive self-alignment of the optical fibers to the optical devices.

It is yet another object of the present invention to provide highly integrated, low profile fiber optic array transmitters and receivers for ultra-high bandwidth data distribution and communication.

A further object of this approach is to establish a precisely defined interface, with respects to physical separation, between the active (photonic) device apertures and the plurality optical fiber termination. The interface permits a precise uniform physical separation of less than 0.15 mm to be achieved across all emitter and/or detector apertures without physically bonding via an adhesive to the optical fiber connector termination. This reduces the dependency on requiring narrow beam divergence emitters and reduces loss in the detector to fiber termination due to bean divergence.

Still another object is the increase in design flexibility by allowing the optical (emitter/detector) to electrical interface assembly to be pre-fabricated and subsequently inserted into the desired package housing of choice. This eliminates the need for customization when used with commercial optical multi-fiber connectors (ferrules).

Yet another objective is the protective laminate interface between the active emitter/detector and the optical fiber termination. This makes the technique directly applicable to reduced failure risk in harsh environments such as military avionics.

The foregoing objects are achieved in a method of terminating a plurality of optical fibers, generally comprising the steps of placing terminal ends of the optical fibers into a connector to create a fiber end face array, locating a plurality of optical devices on a substrate, the optical devices being arranged in an array having a matching geometry as the fiber end face array, and positioning the connector with respect to the substrate to align the fiber end face array with the optical device array. The optical device substrate can be formed as part of a fiber termination fixture which further includes a carrier having means for aligning the carrier with the multifiber connector. The aligning means can take the form of two holes formed in the carrier and adapted to receive respective alignment pins of the connector. The optical device substrate is advantageously affixed to the carrier by forming a first solder ball contact array pattern on a surface of the optical device substrate, forming a second solder ball contact array pattern on a surface of the carrier, wherein the second solder ball contact array pattern matches the first solder ball contact array pattern, and melting a plurality of solder balls disposed between the first solder ball contact array pattern of the optical device substrate and the second solder ball contact array pattern of the carrier such that solder reflow self-aligns the patterns, and further positions the optical device array in a predetermined orientation with respect to the alignment holes in the carrier. The carrier can be thermally enhanced to act as a heat sink when melting the solder balls. In the illustrative embodiment, the optical devices are active optical devices, such as photodetectors or light emitters. The electrical contacts to the optical devices are made either during or after the chip to carrier attachment. The carrier can include electrical point-to-point connections, which allow optical devices possessing electrical contacts on the device frontside, the device backside, or a combination of frontside and backside contacts, to be used. A housing may be provided to support the fiber termination fixture in a predefined location and orientation with respect to a hole formed in the housing which receives the connector.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF AN ILLUSTRATIVE EMBODIMENT

Figure 1:
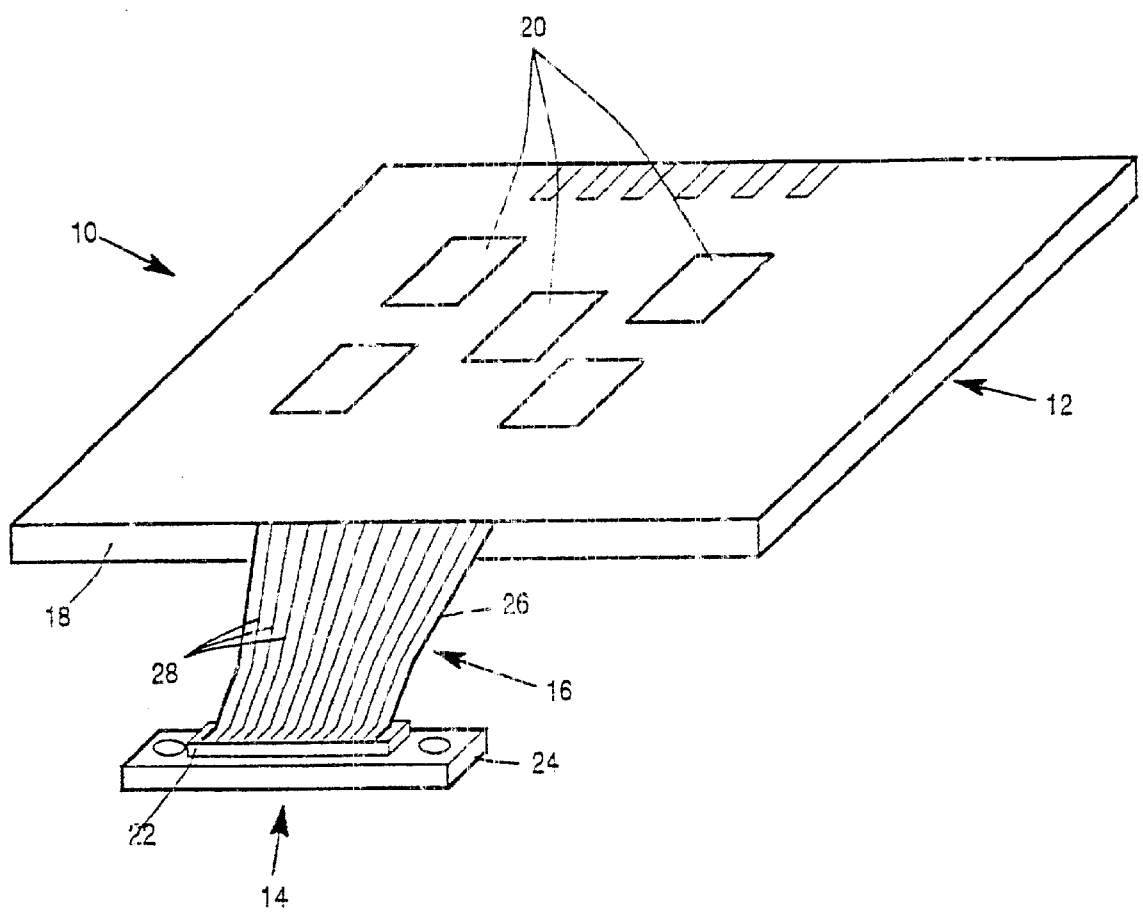
FIG. 1 is a perspective view of one embodiment of an active device terminal for an array of optical fibers, constructed in accordance with the present invention.

With reference now the figures, and in particular with reference to FIG. 1, there is depicted one embodiment 10 of an active device terminal constructed in accordance with the present invention. Terminal 10 includes a driver or receiver circuit module 12, a fiber termination fixture 14, and a flex circuit 16 operatively connecting fiber termination fixture 14 to circuit module 12.

Circuit module 12 includes an electrically insulative substrate or circuit board 18 upon which conventional electronic components 20 are mounted, according to the use of the device as either a transmitter or a receiver. Where terminal 10 is a transmitter, circuit module 12 has amplifiers and drivers for the solid-state light sources described below in fiber termination fixture 14. Where terminal 10 is a receiver, circuit module 12 has amplifier and pre-amplifier receiver electronics for the optical sensors described below in fiber termination fixture 14. Electronic components 20 are preferably surface-mounted on circuit board 18, but may be mounted using lead-through pins. In the illustrative embodiment, circuit module 12 has twelve ports (inputs for a receiver, outputs for a transmitter), corresponding to twelve optical fibers which are to be connected to termination fixture 14, for twelve different data signals.

Termination fixture 14 is generally comprised of an active device chip 22, and an alignment carrier 24 which are discussed further below in conjunction with FIGS. 2A–2F.

Flex circuit 16 includes a generally rectangular substrate or sheet 26, preferably constructed of a flexible, electrically insulative polymeric material such as polyamide, having a plurality of conductive (copper) leads, or traces and conductive planes 28 formed on one or more layers thereon, such as by using a photoeching and lamination process. A given trace 28 has conductive pads at each end to facilitate electrical connection to one of the ports of circuit module 12 at one end, and to a contact formed on active device chip 22 at the other end. The number of such traces 28 on flex circuit 16 depends upon the type of device being used. For a transmitter, twelve traces are provided which are connected to respective contacts for twelve solid-state emitters located on active device chip 22. These contacts are the anodes (p-contacts) of the emitters; a common cathode (n-contact) is provided for the emitter array, and contact with the cathode is made on the backside of active device chip and is an integral part of the mechanical alignment contacts between the device chip and the carrier 22, 24. For a common cathode diode receiver chip a similar 12 trace laminate flex sheet 26 may be used to contact the anodes, and a conductive plane layer used to contact the cathode. When using isolated anode and cathode optical components, or metal-semiconductor-metal (MSM) receiver devices, 24 traces or contacts are provided, two for each of the twelve solid-state transmitter/receiver location on the active device chip, on one or more flex layers. In addition to the bond provided by the electrical connection between the trace pads and the circuit module ports or active device chip contacts, a further physical bond may be provided between sheet 26 and circuit board 18 or active device chip 22 using, e.g., an adhesive, such as an acrylate or silicon-based adhesive.

Flex circuit 16 is designed to support a high-frequency connection, particularly frequencies of five Gbit/sec or more. Flex circuit 16 is also designed to provide impedance matching with the ports of circuit module 12 and the active devices on chip 22.

Figure 2A:
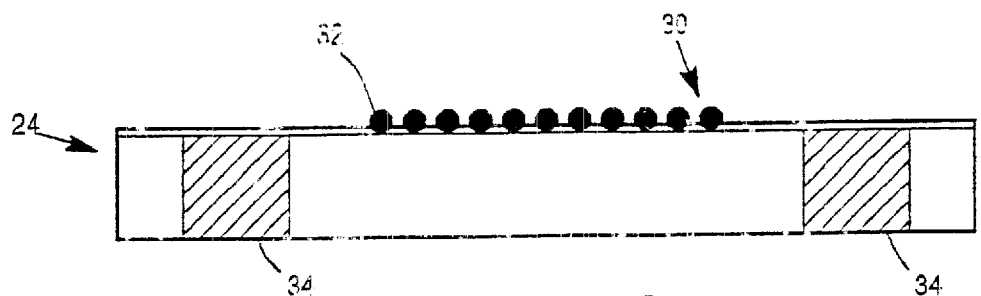
FIG. 2A is a front elevational view of an alignment carrier which is part of a termination fixture used by the active device terminal of FIG. 1.
Figure 2B:
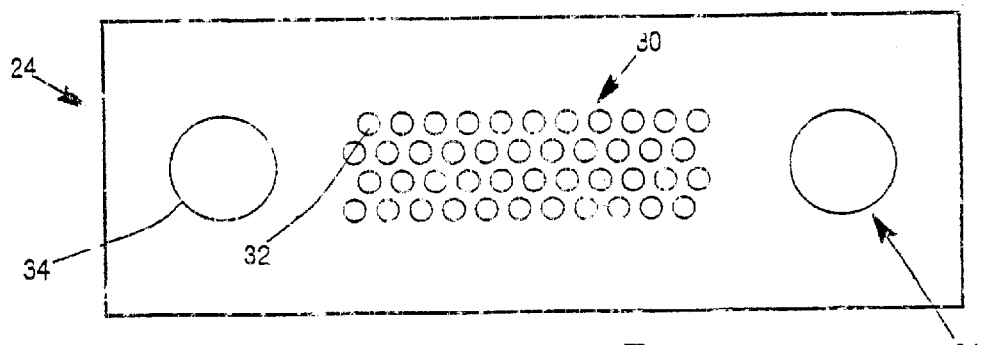
FIG. 2B is a top plan view of the alignment carrier of FIG. 2A.

The construction of termination fixture 14 may be understood by further reference to FIGS. 2A–2F. FIGS. 2A and 2B depict one embodiment of alignment carrier 24, that is specifically adapted for use with the MT connector mentioned in the Background. Alignment carrier 24 is generally a rectangular block, containing alignment pin holes 34, with dimensions and tolerances based on a pre-defined commercial or custom optical fiber array connector, e.g. MT connector. The alignment carrier is fitted with a solder "ball" contact pad array 30 on the upper surface, thereof, comprising a plurality of solder contacts 32. The contact pad array forms an arbitrary pattern, which identifies and maintains a specific pre-defined optical component alignment and orientation relative to the carrier alignment pinholes 34. Either pre-molding, drilling, reactive etching or ion milling processes can be used to form the carrier 24 alignment pinholes 34. The manufacturing process used depends on the material used for the carrier based. Plastic and metal carrier base-materials support molding and drilling manufacturing processes. Ceramic and glass carrier base materials support drilling and etching. Semiconductor carrier base-material support drilling, reactive etching, and ion milling. The carrier contact pad array is located relative to the alignment pinholes, and formed, thereon, such as by using electro-deposited metal, electro-plating, and photolithography processes. The carrier base material may be thermally enhanced in order to function as a heat sink.

Figure 2C:
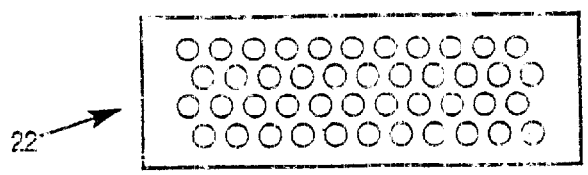
FIG. 2C is a bottom plan view of an active device chip which is also part of the termination fixture.
Figure 2D:
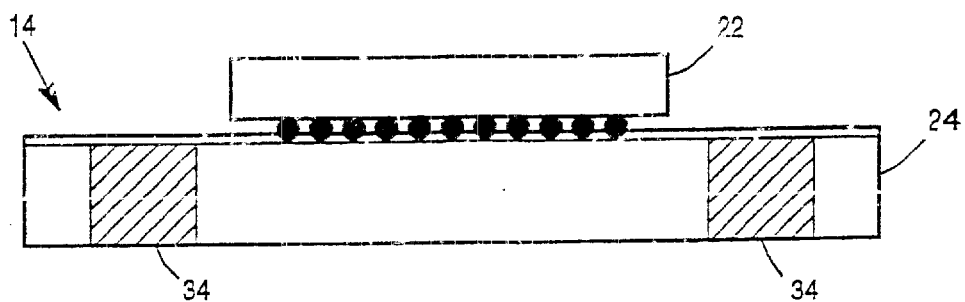
FIG. 2D is a front elevational view of the assembled termination fixture using the alignment carrier of FIGS. 2A–2B and the active device chip of FIG. 2C.
Figure 2E:
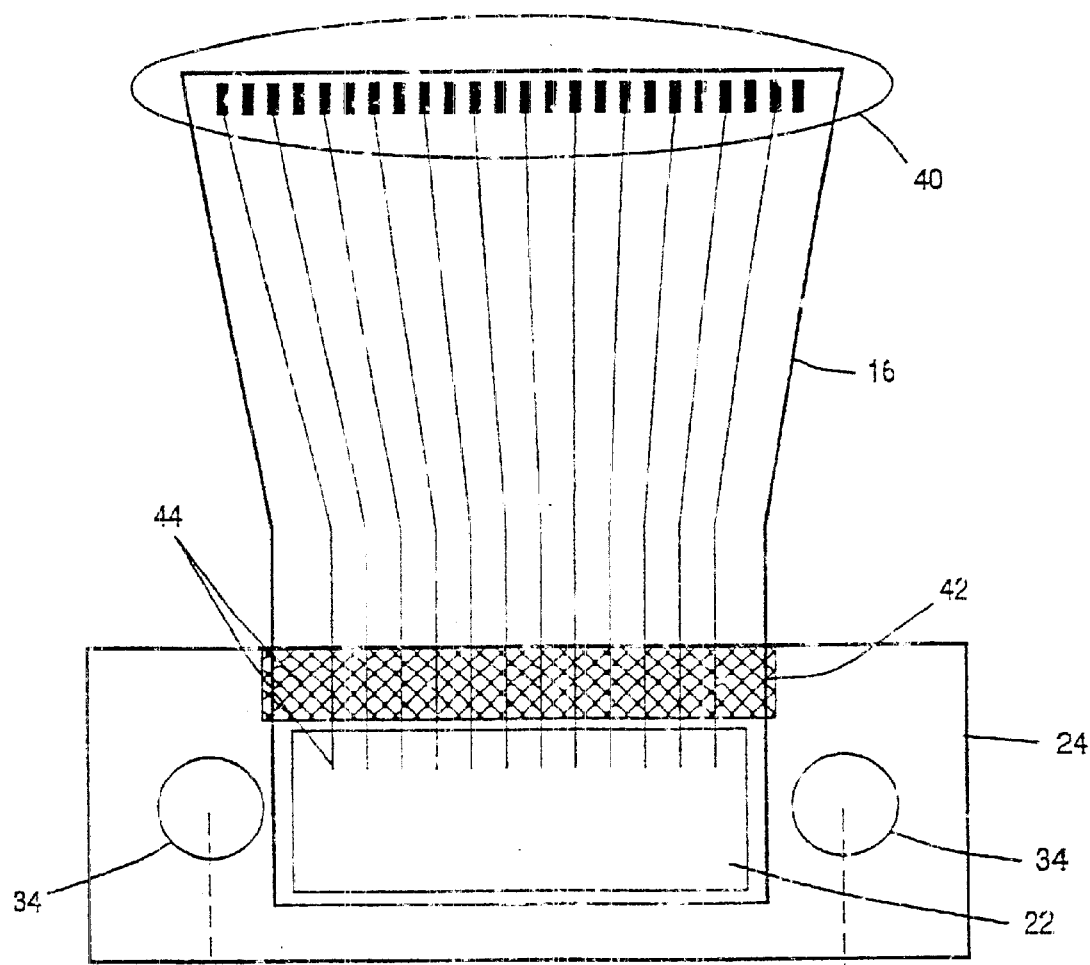
FIG. 2E is a partial top view that shows the active optical chip and carrier assembly attached to the Flex Interconnect.
Figure 2F:
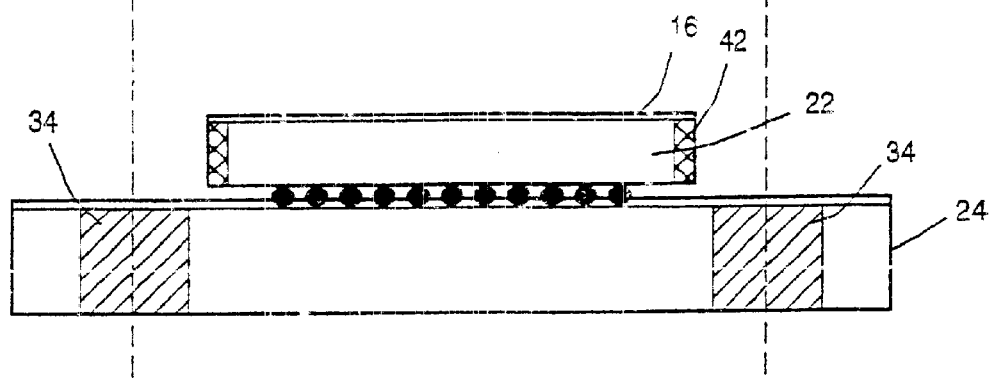
FIG. 2F is a front view of FIG. 2E.

The flex circuit 16 is typically attached to the optical device and carrier assembly, FIG. 2D, after the optical device has been solder reflow attached to the carrier and the critical optical device apertures, FIG. 2E and 44, to carrier alignment pin hole 34 tolerances have been established. Either the optical chip contact array pads or the alignment carrier contact array pads can support the solder balls 30, prior to the optical chip-to-carrier re-flow attachment. FIGS. 2A–2F details the elements of the carrier 24, the alignment pin holes 34, the optical chip and solder alignment pads 22, the solder reflow self-aligned optical chip to carrier assembly, FIG. 2D, FIG. 2E identifies the active optical-chip and carrier assembly attached to the flex Interconnect 16. The laminate flex Interconnect can be pre-formed (pre-manufactured) with metal traces 38. The flex is aligned and adhesive bonded to the active device side of the optical-chip. Final flex trace to active chip connected is formed, thereon, using laser drilled via hole through the non-conducting polymer layer, connecting to the active-chip electrical pads. Electro-deposited metal is used to fill the vias making them electrically conducting 44, and subsequently electrically connecting the vias and chip pads to the metal traces. Photoetching process is then used to establish single point connections from one active-chip pad and its corresponding metal-ized flex-via, to a single flex trace.

If the active optical chip is such that it requires flex metal-plane or trace electrical connection to be made to its backside, then an electrically conductive shim or electrical via feed-through transfer chip 42 can be used. The electrically conductive shim or via feed-through chip transfers the optical-chip backside electrical contacts to the same level (plane) as the optical chip topside electrical contacts. The flex interconnect assembly is then electrically connected to the optical-chip and alignment carrier assembly, as described above, at metal-via contact points 44.

Alternatively, the flex interconnect can be built onto the active chip and carrier assembly by repeated (sequential) polymer lamination, via drill, electro-metal deposition, and photoetching processes. If all the optical-chip electrical contacts are on the backside of the chip, then an optical chip to flex interconnect electrical connection can be accomplished from the carrier base. Flex to carrier electrical connection is accomplished using a pre-fabricated flex, and using lead-frame edge-connection and solder attachment either before or after optical-chip to carrier attachment. Alternatively, the flex interconnect can be built onto the carrier base prior to optical-chip attachment, and prior to alignment solder contact array formation, by repeated (sequential) polymer lamination, via drill, electro-metal deposition, and photo-etching processes. The solder contact array can then be added to the flex topside, and the optical-chip subsequently solder re-flow attached and self-aligned.

Active device chip 22 is also a generally rectangular block. A replica of the carrier solder ball array pattern is formed on the optical-chip backside using photolithography, e.g. inferred based, electrometal deposition, and etching processes 22, as seen in FIG. 2C. The formed optical-chip solder contact array identifies and maintains a specific alignment between the optical-chip device aperture, i.e. laser and detector apertures, and the carrier base 24 alignment pin locations. In this manner, active device chip 22 may be placed over solder ball contact array 30 without requiring strict tolerances and then, when the solder balls 32 melt, the solder reflow self-aligns the pattern on active device chip 22 with the pattern on carrier 24. Thus, solder ball contact array 30 not only affixes active device chip 22 to carrier 24, but further ensures that the array of active devices on the upper surface of chip 22 are properly oriented with respect to alignment pin holes 34 (and thus will be properly oriented with the fiber ends when an MT connector is attached to carrier 24 using alignment pin holes 34). The solder balls may be melted by various means, including inferred radiation and zoned belt furnace re-flow.

Those skilled in the art will appreciate that the foregoing technique may be applied to any commercially available fiber optical connector, not just the MT connector, by simply providing different holes or precision guides on carrier 24 which correspond to alignment elements for the particular connector design. Also, the active devices on chip 22 must be placed in the same geometry as the optical fiber array in the connector. While the illustrative embodiment depicts a fiber array wherein all of the fiber end faces are coplanar, the present invention could even be adapted to non-coplanar fiber end face arrays, e.g., a connector body having a forward tip with a convex surface, mating with a concave surface of an active device chip.

The active chip may be (but is not limited to) Gallium Arsenide (GaAs) based Vertical Cavity Surface Emitting Lasers (VCSEL) and GaAs based metal-semiconductor-metal (MSM) detectors, and commercial (or custom) PIN and/or avalanche photo-diodes arrays. The carrier can be comprised of metal patterned ceramic, metal matrix, and metal-plastic hybrid material similar to commercial plastic electronic packages.

Materials that could be used to construct the carrier would be those that would provide high precision for critical alignment. These would be typical for printed wiring board construction including high temperature epoxy-glass or polyamide. Materials like a liquid crystal polymer (LCD) or ceramic would also provide good alignment characteristics. Optical array communication currently is more effectively performed using arrays of Vertical Cavity Surface Emitting Lasers (VCSEL) and photodiodes. These devices have excellent optical properties while being able to be constructed using standard GaAs integrates circuit processes. A benefit relative to this patent is that alignment pads placed on the backside of the VCSEL/Photodiode substitute shown in FIG. 2C can be done using long wavelength photolithography and optical inspection techniques since GaAs material is transparent at these wavelengths.

Figure 3A:
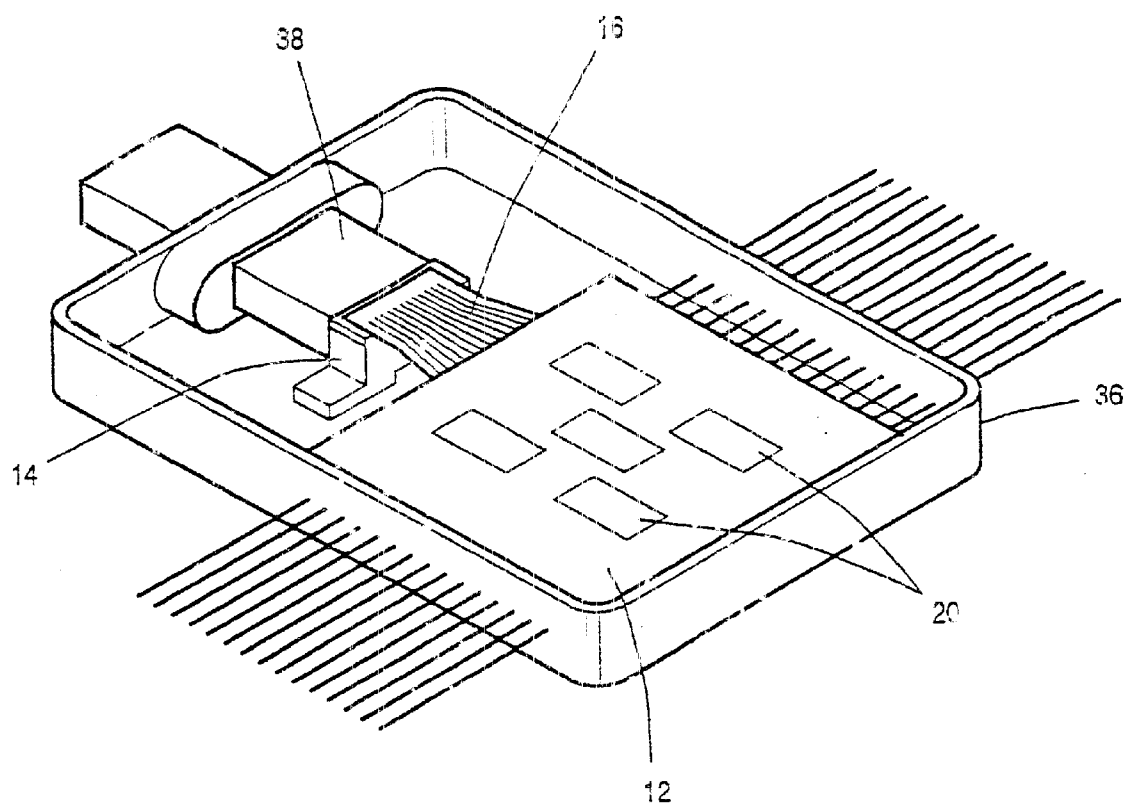
FIG. 3 is a perspective view illustrating deployment of an active device terminal of the present invention within a housing that also serves to retain a multifiber connector.
Figure 3B:
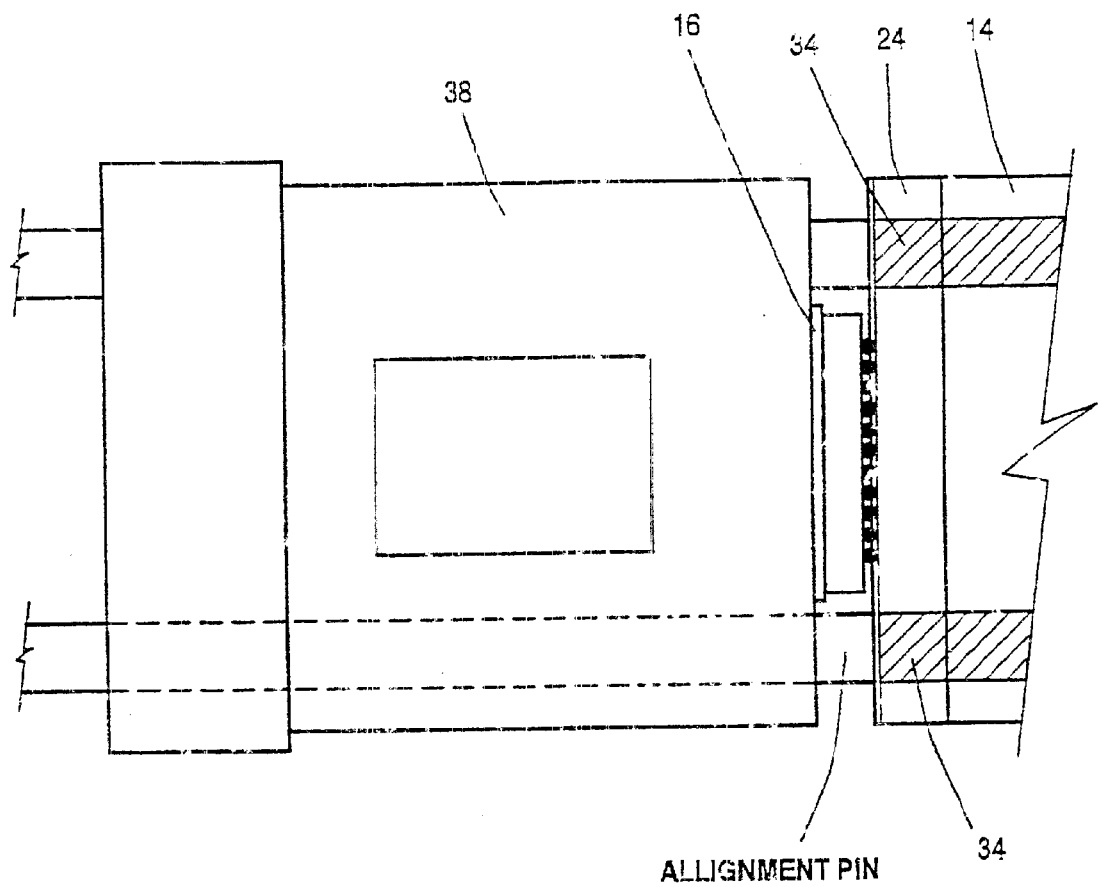
Figure 4:
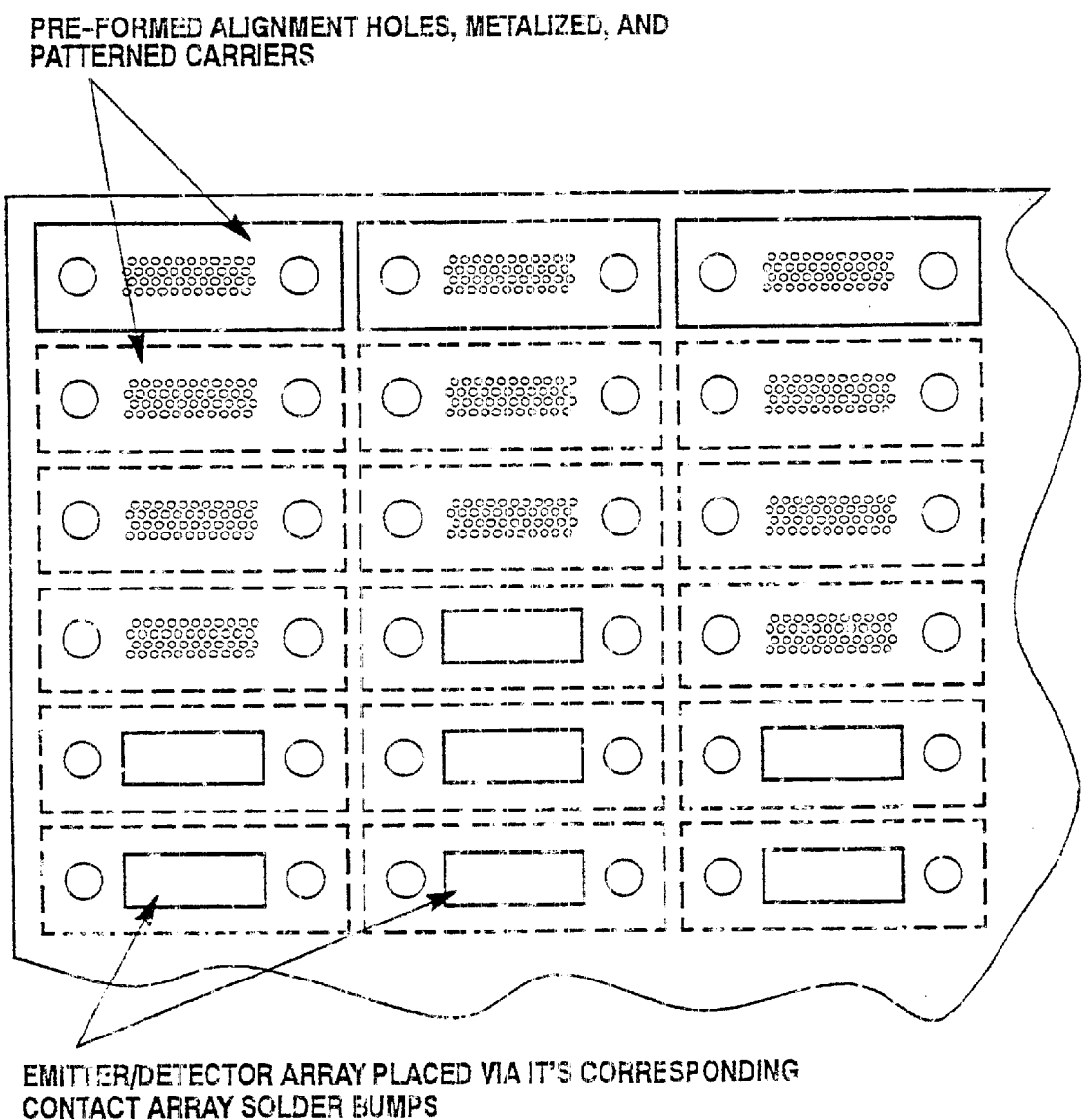
FIG. 4 is a top plan view illustrating pick-and-place production of carriers having active emitter/detectors according to the present invention.

Referring now to FIGS. 3a and 3b, active device terminal 10 may be conveniently packaged in a housing 36 which is further adapted to support the particular connector being terminated, and to position the connector with respect to termination fixture 14. FIG. 3 illustrates an MT connector 38 whose connector body extends through a hole formed in a sidewall of housing 36. Mounting tabs having been attached to carrier 24 to affix the termination fixture in a predefined location and orientation with respect to the hole that receives MT connector 38. In this manner, when MT connector 38 is inserted into the hole, the alignment pins visible in FIG. 3b and not visible in FIG. 3a, of MT connector 38 are guided into holes 34 of carrier 24, which precisely aligns the array of fiber end faces with the active devices on chip 22. The polymer flex interconnect 16 attached to the optical-chip topside protects the optical-chip apertures from excess pressure and contact damage at the interface between the optical fiber connector endface and chip topside surface. Similarly, the polymer layer acts as a mechanical buffer and maintains high chip-to-connector interface reliability under harsh thermal, vibration, and shock environments. The flex also allows a predictable and reproducible separation to be achieved between optical-chip apertures and the optical fiber-ends coupling. This reduces sensitivity to both optical-chip design and optical coupling losses associated with beam divergence.

Optical components possessing only backside contacts and using the process of attaching the flex (electrically and mechanically) through contacts on the alignment carrier base, i.e. the polymer flex does not protect the active top-side on the optical-chip, will require alternate protection against abrasion and excess pressure during assembly. This is easily accomplished by polymer laminating (or coating) the optical-chip topside prior to chip attachment to the alignment carrier. The depth of insertion of the fiber connector to the flex-ship-carrier assembly, FIGS. 2e and 3b, may be controlled, such as by recessing the optical-chip within the alignment carrier 24, or by using a windowed shim-stop inserted between the optical-chip carrier assembly and the fiber connector. Similarly, insertion depth and pressure may be controlled by providing a boss or stop (formed on the housing 36) that abuts the connector. A latch or other means can be provided to retain the connector in the housing.

By modifying the construction of the package housing 36, and the order of the component assembly depicted in FIG. 3a, a seal or hermetic final package assembly can be achieved, FIG. 3a. In this format a sealed or hermetic optical connector feed-through 38, e.g. MT connector based, is attached to the housing 36 prior to the attachment of the optical-chip carrier and termination fixture 14 assembly. This allows the entire housing 36 (with optical connector feed-through) to be pre-fabricated prior to insertion and assembly of the electrical and optical components. In this manner, the flex-optical chip-alignment carrier (16, 22, 24, and 14) alignment holes 34 are inserted over the connector 38 alignment pins, FIG. 3b, forming the necessary optical fiber connector to optical chip connection. The flex electrical interface connection, using solder re-flow processes, can then be made to the electrical circuit assembly 12. The integrity of the optical-chip-to-connector interface is maintained by mechanical and thermal attachment of the termination fixture 14 to the housing 36 base. This is achieved by using processes such as epoxy adhesive or solder re-flow to bonding.

The dimensions of termination fixture 14 may vary according to the particular applications. The following exemplary dimensions are used for compatibility with a conventional MT connector. Active device chip 22 is about 2.0 mm wide, 2.8 mm long, and 0.6 mm high. The active devices on chip 22 are linearly aligned about 1.6 mm from a lengthwise edge of the chip with 250 $\mu$m spacings, and the device closest to a side of the chip is about 400 $\mu$m from that edge. Traces about 1.3 mm long lead from each active device to the contacts that become connected to the pads of flex circuit 16. Carrier 24 is about 2.5 mm wide, 6.0 mm long, and 1.5 mm high. The centers of alignment holes 34 are about 4.6 mm apart, and the holes have 0.744 mm diameters. The diameters of the cavities for the solder balls is about 150 mm.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, while the description has discussed an active device terminal that is either a transmitter or a receiver, it would also be possible to provide a transceiver wherein the termination fixture aligns the array of fiber ends with a combined active transmitter (e.g. laser) and detector (e.g. PIN, MSM) device chip, or by accommodating (aligning) a passive array of device chip, e.g., having an array of partially silvered micromirrors and attendant passive optics used to allow both transmission of signals to the fibers from emitters, and reception of signals exiting the terminal ends of the fibers using detectors. It is therefore contemplated that such modifications can be made without departing from the spirit or scope of the present invention as defined in the appended claims.

What is claimed is:

1. An optical to electrical interface and connector carrier assembly comprising
   (a) an optical-electrical device comprising:
      (1) a first surface,
      (2) a second surface parallel to said first surface,
      (3) a plurality of aligned optical transmitter port elements adjacent said first surface,
      (4) a plurality of electrical contacts for electrical connection to said optical-electrical device, and
      (5) a first plurality of contact alignment elements on said second surface
   (b) a connector carrier comprising:
      (1) a contact surface comprising a second plurality of contact alignment elements that are arranged in a matching pattern with said first plurality of contact alignment elements, and
      (2) a first alignment configuration for matching a second alignment configuration of an external connector,
   (c) a plurality of solder balls each of which are inserted into contact with one contact alignment element of said first plurality of contact alignment elements and with one contact alignment element of said second plurality of contact alignment element and is melted into secure contact with said contact alignment elements, and
   (d) a flexible insulating sheet comprising a plurality of electrically conductive leads formed therein wherein said electrically conductive leads are connected to said plurality of electrical contacts.

2. An optical to electrical interface and connector carrier assembly as claimed in claim 1 wherein said first alignment configuration comprises a pair of spaced apart alignment holes each for receiving one pin of a pair of connector pins that form a second alignment provision on an external carrier.

3. An optical to electrical interface and connector carrier assembly comprising:
   (a) an optical-electrical device comprising:
      (1) a first surface,
      (2) a second surface parallel to said first surface,
      (3) a plurality of aligned optical receivers port elements adjacent said first surface,
      (4) a plurality of electrical contacts for electrical connection to said optical-electrical device, and
      (5) a first plurality of contact alignment elements on said second surface,
   (b) a connector carrier comprising:
      (1) a contact surface comprising a second plurality of contact alignment elements that are arranged in a matching pattern with said first plurality of contact alignment elements, and
      (2) a first alignment configuration for matching a second alignment configuration of an external connector,
   (c) a plurality of solder balls each of which are inserted into contact with one contact alignment element of said first plurality of contact alignment elements and with one contact alignment element of said second plurality of contact alignment elements and is melted into secure contact with said contact alignment, and
   (d) a flexible insulating sheet comprising a plurality of electrically conductive leads formed therein wherein said electrically conductive leads are connected to said plurality of electrical contacts.

4. An optical to electrical interface and connector carrier assembly as claimed in claim 3 wherein said first alignment configuration comprises a pair of spaced apart alignment holes each for receiving one pin of a pair of connector pins that form a second alignment provision on an external carrier.

* * * * *